United States Patent [19]

Grisham et al.

[11] Patent Number: 5,531,904

[45] Date of Patent: Jul. 2, 1996

[54] GAS SPARGING METHOD FOR REMOVING VOLATILE CONTAMINANTS FROM LIQUIDS

[75] Inventors: Thomas L. Grisham, Tyler; Janet K. Peters, Gilmer, both of Tex.

[73] Assignee: Revtech Industries, Inc., Kilgore, Tex.

[21] Appl. No.: 406,502

[22] Filed: Mar. 20, 1995

[51] Int. Cl.$^6$ .................................................. C02F 1/24
[52] U.S. Cl. ................ 210/703; 210/702; 210/718; 210/221.2; 210/787; 210/512.1; 96/156; 96/206; 96/216
[58] Field of Search ................ 96/156, 206, 216; 210/702, 703, 718, 787, 188, 221.2, 512.1

[56] References Cited

U.S. PATENT DOCUMENTS

| | | |
|---|---|---|
| 4,163,719 | 8/1979 | Macierewicz et al. |
| 4,279,743 | 7/1981 | Miller. |
| 4,397,741 | 8/1983 | Miller. |
| 4,399,027 | 8/1983 | Miller. |
| 4,744,890 | 5/1988 | Miller et al. |
| 4,838,434 | 6/1989 | Miller et al. |
| 4,997,549 | 3/1991 | Atwood. |
| 5,202,032 | 4/1993 | Shoemaker .......................... 210/718 |

OTHER PUBLICATIONS

Joan V. Boegel; "Air Stripping and Steam Stripping"; *Hazardous–Waste Recovery Processes*, Section 6.8; pp. 6.107–6.117.

Ye Yi; "2.0 A Novel High–Capacity Technology for Removing Volatile Organic Contaminants from Water"; *Proceedings of Waste Stream Minimization and Utilization Innovative Concepts—an Experimental Technology Exchange*; Austin, Texas, Apr. 22–23, 1993; pp. 2.1–2.2.

*Primary Examiner*—Robert A. Dawson
*Assistant Examiner*—David A. Reifsnyder
*Attorney, Agent, or Firm*—Ronald B. Sefrna

[57] ABSTRACT

Apparatus for removing volatile contaminant compounds from a liquid by sparging a cleaning gas therethrough comprises a volatile contaminant extraction assembly including a hollow porous tube surrounded by an outer jacket defining a gas plenum between the jacket and the porous tube; a contaminated liquid feed assembly including a nozzle for injecting liquid into the porous tube in a spiraling flow pattern around and along the porous tube; a gas-liquid separator assembly including a nonporous degassing tube coaxially aligned with and connected to the porous tube, a separator tube coaxially aligned with and connected to the degassing tube and flaring outwardly in diameter from the degassing tube, and a gas duct coaxially aligned with the separator tube and extending into the separator tube to collect and convey cleaning gas therefrom; a clean liquid collection assembly; and a gas discharge assembly. A method of removing volatile contaminants from a liquid comprises the general steps of introducing a stream of contaminated liquid to the hollow interior of a cylindrical porous tub in a thin film following a spiral flow pattern around and along the wall of the tube; controlling the physical characteristics of the liquid film and the flow pattern followed by the film through the tube; sparging cleaning gas through the wall of the tube and into the liquid film at a preselected flow rate; segregating contaminant laden cleaning gas from the liquid within the tube; and separating the cleaned liquid stream from the contaminant laden gas stream.

19 Claims, 8 Drawing Sheets

GAS SPARGING METHOD FOR REMOVING VOLATILE CONTAMINANTS FROM LIQUIDS

FIELD OF THE INVENTION

The present invention generally relates to apparatus for and methods of removing volatile contaminants from liquids, and in its preferred embodiments more specifically relates to apparatus for and methods of removing volatile contaminants such as pollutant and toxic compounds from water by transfer of the contaminants from the water to a gaseous stream.

BACKGROUND OF THE INVENTION

Volatile contaminants (VCs) of various forms are often present in waste water from, e.g., industrial sources in process or cooling water used in industrial operations, and in drinking water supplies. The VCs may be introduced into the water from a wide variety of sources, such as chemical processes, cleaning processes, crude oil and natural gas production operations, leaking storage tanks, and surface spills. The problems associated with the presence of VCs in water are wide spread, and the need for effective and efficient removal of such contaminants is increasingly recognized.

The Federal Clean Air Act, as amended in 1990, required the U.S. Environmental Protection Agency to develop and implement National Emission Standards for Hazardous Air Pollutants (NESHAP), and the EPA has promulgated regulations establishing emission limits for over 110 chemicals. Those regulations set forth strict limitations on emissions of listed chemicals from waste water into the environment.

Various methods of and apparatus for removing VCs from water and other liquids have been known and used in the prior art for a number of years. One of the traditional approaches, generally referred to as "air stripping", removes VCs from a contaminated liquid by passing a stream of clean air or other gas through the water so that VCs transfer from the liquid to the gas and may be removed from the system with the exiting gas. The mass transfer of VCs from liquid to gas proceeds in accordance with, and is generally described by, Henry's Law, which states that the partial pressure, and thus the concentration, of a volatile compound in a volume of gas in interfacial contact with a dilute solution of that compound in water is directly proportional to the concentration of the compound in the solution. That relationship can be mathematically expressed by the following equation:

$$Y_A = (H_c/P_T)(X_A)$$

Where
$Y_A$=the mole fraction of compound A in air;
$H_c$=Henry's Constant for compound A, in atmospheres/mole fraction;
$X_A$=the mole fraction of compound A in solution; and
$P_T$=total pressure of the reaction system, in atmospheres.

So long as the concentration of a particular contaminant in the water is higher than the equivalent concentration of that contaminant in a volume of gas in interfacial contact with the water, transfer of molecules of the contaminant from water to gas will occur. Once the concentration of the contaminant in the water and the concentration in a volume of gas have reached equilibrium, no further net transfer will occur. Conversely, contaminant transfer from gas to liquid will occur across a gas-liquid interface when the concentration of the contaminant in the gas is above equilibrium in comparison to the concentration in the liquid, and such transfer will continue until equilibrium is reached.

It is generally understood that the mass transfer of a volatile component from a volume of liquid to a volume of gas across an interfacial contact area is not instantaneous, but is subject to various limiting factors including the rate of transfer across the interface, the rate of diffusion of component molecules through the liquid to the interface, and the rate of diffusion of component molecules through the gas from the interface. In most cases of interest (i.e., low concentrations of the volatile component in water) the rate of diffusion of the volatile component through the liquid is the most significant factor, and volatile component transfer from liquid to gas is favored by maximizing the interfacial area relative to liquid and gas volumes and by minimizing the distance of diffusion through the liquid to the interface.

The dynamics of mass transfer across a gas-liquid interface can be quantified. The rate of transfer of a compound at the gas-liquid interface has been derived by Bird, Stewart, and Lightfoot, and expressed as $$N_A = (D_{AB} C_{AO}/a)(1-r)$$

Where
$N_A$=molar flux (moles/L$^2$t) (L=length; t=time)
$D_{AB}$=binary diffusivity for system A-B (L$^2$/t)
$C_{AO}$=the interfacial concentration of A in the liquid phase, which is assumed to be at equilibrium with the gas phase at the interface (moles/L$^3$)
a=film thickness (L)
r=$C_d/C_{AO}$
Ca=concentration in the main body of the liquid.

The foregoing equation is taken from the book *Transport Phenomena*, R. Byron Bird, Warren E. Stewart, and Edwin N. Lightfoot, John Wiley & Sons, Inc., 1960 (at page 535).

Traditional methods of air stripping and steam stripping VCs from water include the use of simple aerated tanks, spray towers, bubble tray columns, and packed columns to create an gas-water interface. While these traditional methods and associated apparatus do achieve contaminant transfer and thus some VC removal from the water, such traditional approaches are very inefficient, requiring long processing times and high equipment volumes. The inefficiency associated with the traditional prior art approaches arises largely from the relatively low ratios of gas-water interfacial area to volumes provided by the equipment, and the relatively long liquid diffusion distances to an interface.

It has been suggested that improved VC removal performance may be achieved through the use of an air sparged hydrocyclone similar to designs used in the mineral processing industry for separation of solid particles from an aqueous suspension. Examples of particle separation methods and apparatus may be found in U.S. Pat. Nos. 4,279,743; 4,397,741; 4,399,027; 4,744,890; 4,838,434; and 4,997,549. In a 1993 paper ("A Novel High-Capacity Technology for Removing Volatile Organic Contaminants From Water", *Proceedings of Waste Stream Minimization and Utilization Innovative Concepts—An Experimental Technology Exchange*, Ye Yi, April, 1993) an air sparging process and apparatus was proposed. More specifically, the paper disclosed a continuous process in which contaminated water is introduced into the interior of a porous tube in a swirl flow pattern and air is introduced through the porous tube into the water flow. The porous tube is disposed in a vertical orientation and the contaminated water is pumped into the tube at the top and allowed to swirl around the inner wall of the tube to the bottom, while air is forced through the tube into contact with the water. The air to water flow ratio disclosed and used by Yi is two (2).

Yi further teaches that it will be necessary for the water be recycled through the apparatus a number of times to achieve significant VC reduction. In the Yi example, the contaminated water was recycled six times to achieve a reduction in benzene concentration from 150 ppm to 10 ppm.

Although the method suggested by Yi indicated a potential for effective VC removal, current environmental regulations and pollution prevention concerns demand greater reductions in contaminant concentrations, and process economics demand higher efficiencies than the possibilities recognized by Yi. The process parameters taught by Yi and the apparatus designs taught by the particle separation reference patents upon which the Yi teaching is based still fall short of solving the problems in removal of VCs from water and of addressing the needs of industry without the disadvantages of the prior art.

SUMMMARY OF THE INVENTION

The present invention provides a method of removing VCs from a liquid stream by mass transfer of the VCs to a clean gas stream, and also provides apparatus for performance of the removal process. With the method and apparatus of the invention, VC removal may be performed at very high efficiency in a single pass through a compact processing unit, to achieve effluent concentrations well within regulatory requirements. The present invention takes into account the significant differences between the physical mechanisms involved in the separation of particles from an aqueous slurry by agglomeration of relatively large particles onto bubbles of air, and the extraction of chemical contaminants from a liquid stream through molecular transfer from liquid solution into bubbles of gas across a liquid-gas interface. Though superficially similar on a gross scale, these mechanisms exhibit substantial differences in the physics of their operation.

The apparatus of the invention generally includes a horizontally disposed cylindrical tube with a porous wall and a hollow interior, a contaminated liquid feed assembly disposed at one end of the tube, a gas-liquid separator assembly disposed at the opposite end of the tube a clean liquid collection assembly, and a gas discharge assembly. The tube is surrounded by an outer jacket that encloses the porous wall and forms a plenum for cleaning gas. The plenum may contain multiple segments or sections to assure uniform distribution of the cleaning gas along the length of the tube.

Contaminated liquid is fed tangentially into the interior of the tube through the contaminated liquid feed assembly with sufficient pressure and flow rate to create a high velocity flow of the liquid in a thin film around and along the inner surface of the porous wall of the tube. The high velocity flow of the liquid in a swirl pattern around the tube produces a centrifugal force of significant magnitude, acting to force the liquid against the inner surface of the tube with an acceleration vector generally perpendicular to the longitudinal axis of the tube. The liquid velocity, and thus the outward acceleration, is sufficient to maintain the thickness of the liquid film through the length of the tube with insignificant variation.

Pressurized cleaning gas is introduced into the plenum between the jacket and the outer surface of the porous wall of the tube and forced through the porous wall. The cleaning gas exits the porous wall at its inner surface and is immediately contacted by the contaminated liquid, which is moving at high velocity relative to the wall and to the cleaning gas as it enters the interior of the tube. The cleaning gas is sheared from the porous wall by the rapidly moving liquid into a multitude of very fine bubbles, which are carried by the moving liquid in its swirl flow pattern around the inner surface of the porous wall. The bouyancy of the bubbles relative to the liquid causes them to move toward the center of the tube against the centrifugal (outward) acceleration, through the film of liquid as it moves around the inner surface of the tube.

As the bubbles pass through the contaminated liquid, molecules of the contaminant compound are transferred from the liquid to the gas in accordance with Henry's Law, decreasing the VC concentration in the liquid and increasing the VC concentration in the gas. Upon completion of its passage through the tube, the cleaned liquid exits the tube through the gas-liquid separator assembly to the clean liquid collection assembly, and the VC laden gas is collected by the gas discharge assembly. It is preferred that the liquid flow and gas flow be cocurrent for improved operating efficiency. The gas-liquid separator assembly serves to cleanly divide the liquid stream from the gas stream and prevent re-contamination of the liquid as a result of intermingling of the contaminant laden gas with cleaned liquid.

The operating parameters of the method of the invention are selected to optimize the efficiency of VC removal and the overall operating efficiency of the apparatus. Contaminated water is introduced to the apparatus at substantially higher flow rates than are used in methods and apparatus for separation of particles from an aqueous slurry, and the ratio of the flow rate of cleaning gas to the flow rate of contaminated water is substantially higher than both the ratio used for particle separation and the ratio suggested by Yi. The flow rate of contaminated water is determined interactively with the design of the processing apparatus so as to produce centrifugal force fields with radial accelerations in the range of 700 G (where G is the standard gravitational acceleration), compared to accelerations of 70 G to 200 G used for particle separation. The ratio of air flow rate to water flow rate utilized in the method of the invention is in the range of 30 to 1, compared to ratios of less than 5 to 1 used for particle separation and ratios of 2 or 3 to 1 suggested by Yi.

The operating parameters of the method of the invention produce conditions that encourage optimal contaminant transfer from the liquid to the cleaning gas; minimizing the dimension of gas bubbles produced in the apparatus (thereby maximizing the ratio of gas-liquid interfacial area relative to volume), dynamically mixing gas bubbles with liquid (thereby rapidly replenishing the supply of contaminant molecules in immediate proximity to the gas-liquid interface and minimizing liquid dispersion mass transfer limitations), optimizing the contact time between bubbles and liquid for contaminant transfer to reach equilibrium (thereby avoiding inactive gas-liquid contact), and minimizing post-equilibrium contact between VC laden gas and cleaned water (thereby minimizing re-contamination by gas to liquid contaminant transfer).

The method and the apparatus of the invention, as well as the features and advantages associated therewith, will be described in more detail with reference to the accompanying drawing figures.

DETAILED DESCRIPTION OF THE PREFERRED EMBODIMENTS

Figure 1:
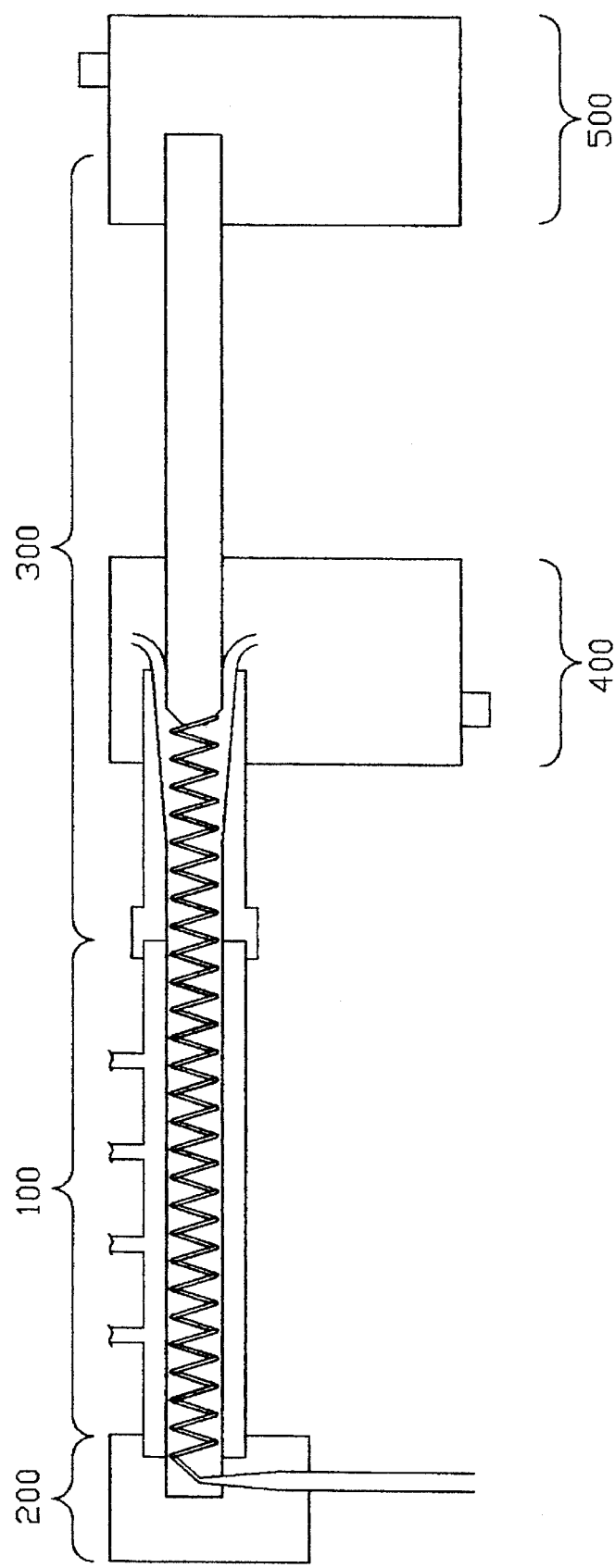
FIG. 1 is a schematic illustration of the apparatus of the invention, identifying the major assemblies and illustrating the liquid flow through the apparatus of the invention.
Figure 2:
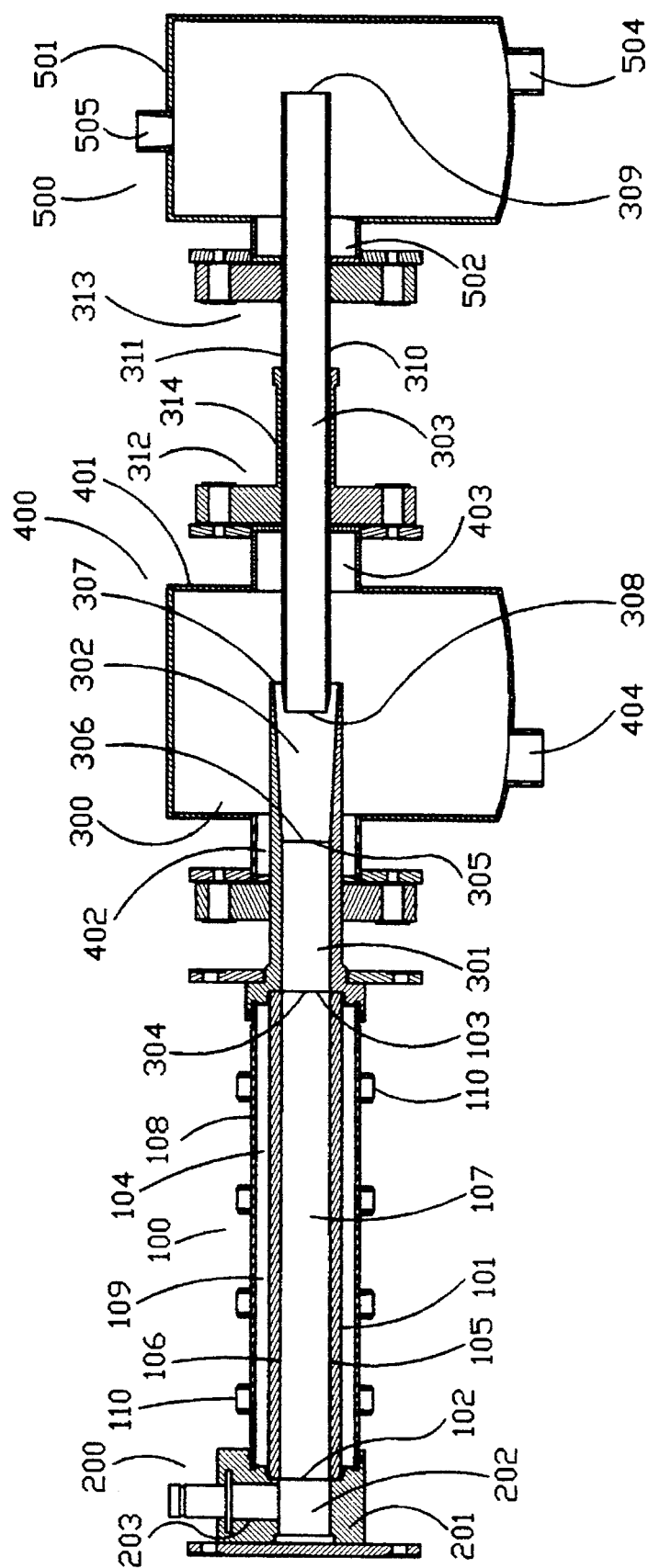
FIG. 2 is a sectioned side elevation view of the preferred embodiment of the apparatus of the invention.
Figure 3:
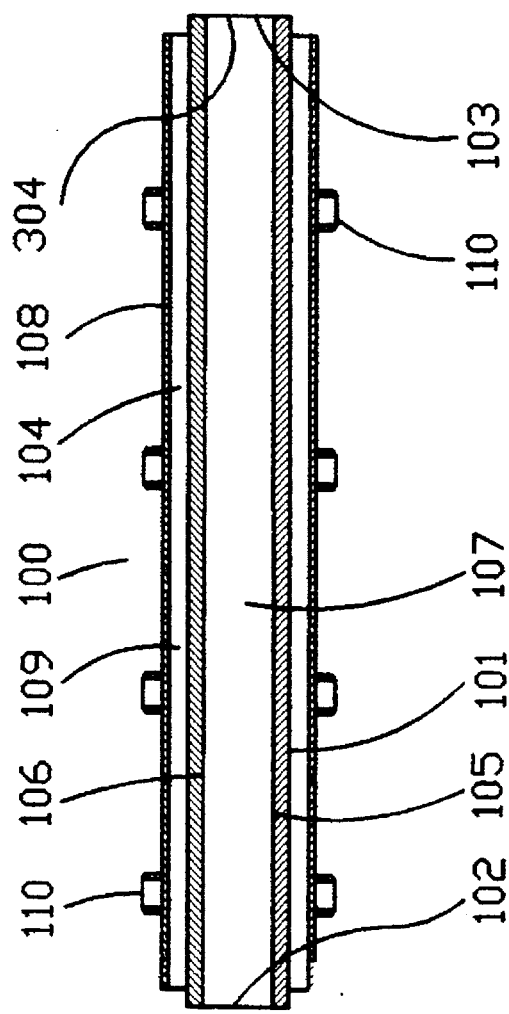
FIG. 3 is a sectioned side elevation view of the preferred embodiment of the VC extraction assembly of the apparatus.
Figure 4:
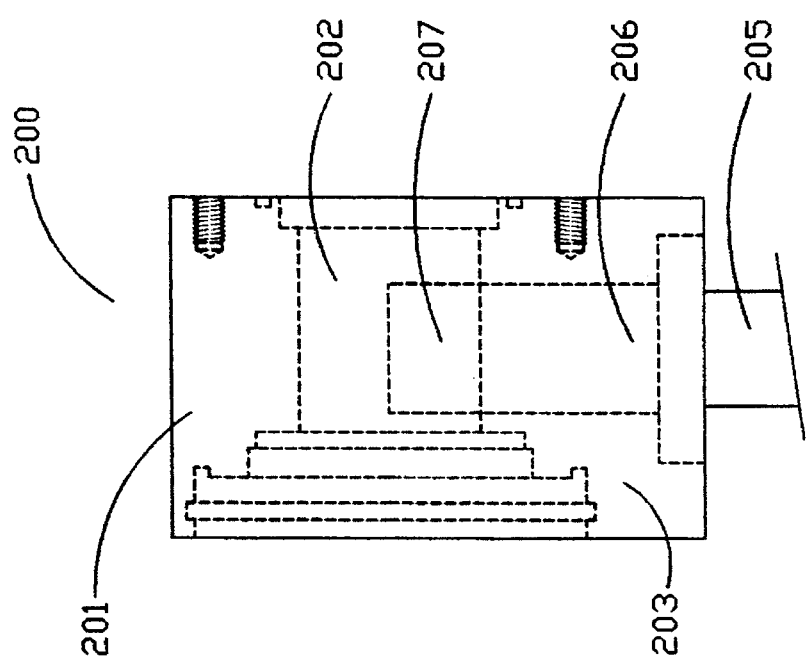
FIG. 4 is a view of the preferred embodiment of the contaminated liquid feed assembly of the apparatus, from the side of the apparatus.
Figure 5:
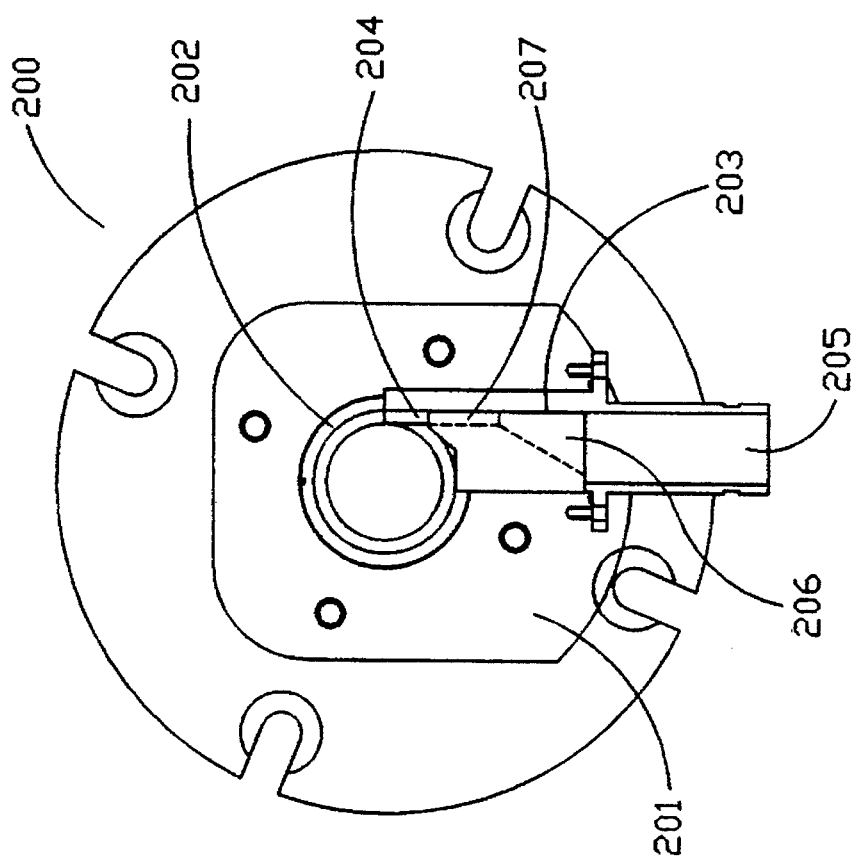
FIG. 5 is a view of the preferred embodiment of the contaminated liquid feed assembly of the apparatus, from the first end of the apparatus.
Figure 6:
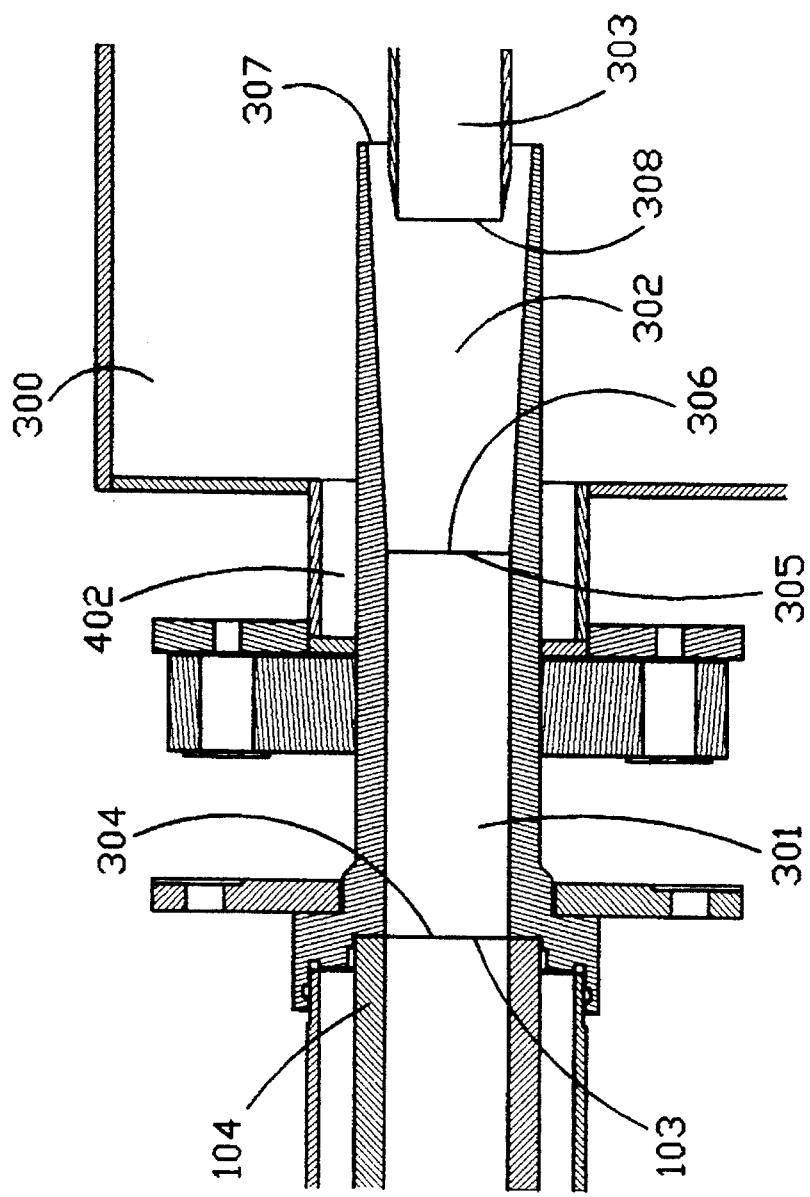
FIG. 6 is a sectioned side elevation view of the preferred embodiment of the gas-liquid separator assembly of the apparatus.
Figure 7:
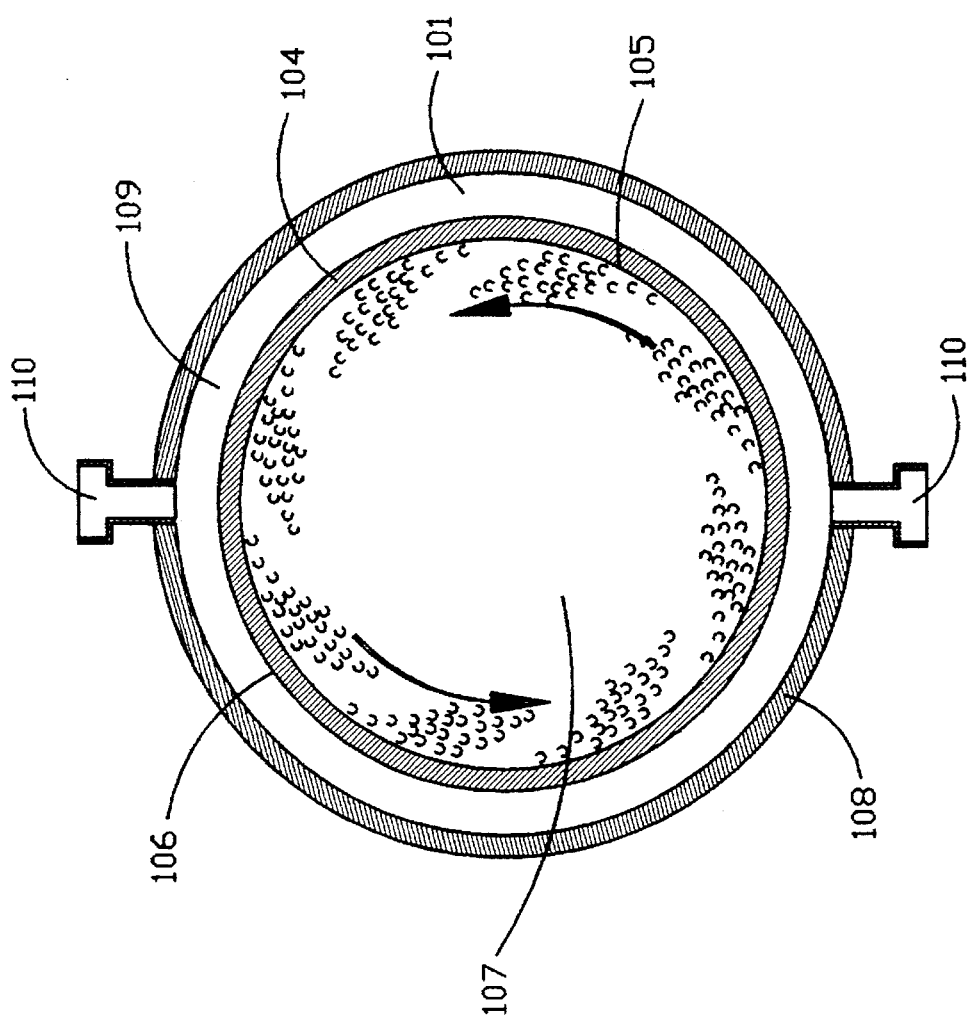
FIG. 7 is a cross-sectioned end view of the preferred embodiment of the VC extraction assembly of the apparatus, showing the mixed liquid-gas film and indicating the swirl flow pattern of liquid through the apparatus.

Referring to the drawing figures, and initially to the schematic illustration of FIG. 1, the apparatus of the invention generally comprises a VC extraction assembly 100, a contaminated liquid feed assembly 200, a gas-liquid separator assembly 300, a clean liquid collection assembly 400, and a gas discharge assembly 500. The apparatus of the invention will be described in detail, with general reference to the method, and details of the method of the invention will then be described in the context of the apparatus.

Figure 8:
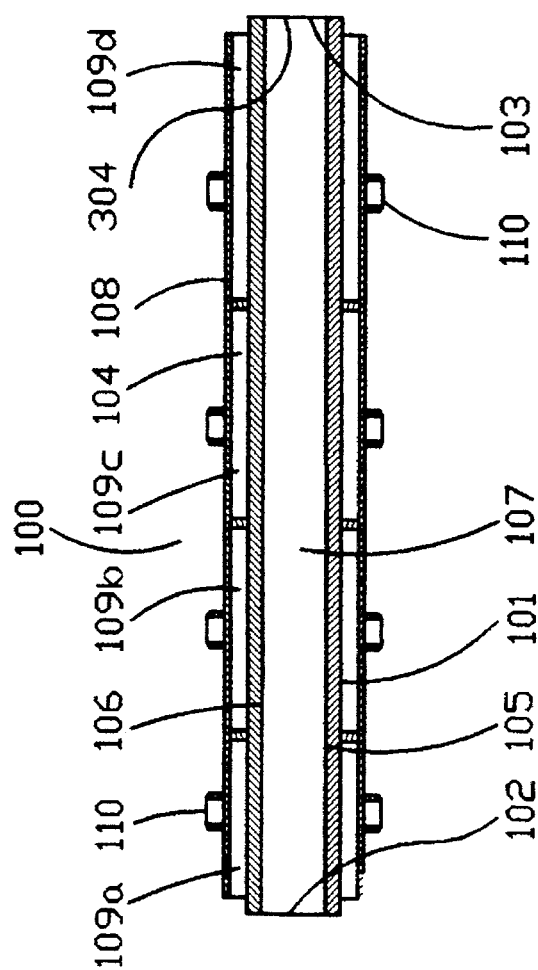
FIG. 8 is a sectioned side elevation view of an alternative embodiment of the VC extraction assembly of the apparatus, in which the gas plenum is divided into independent sections.

VC extraction assembly 100 of the preferred embodiment of the invention includes an elongate cylindrical tube 101, with a first end 102 and a second end 103, disposed with the longitudinal axis of tube 101 in a generally horizontal orientation. Tube 101 is formed with a continuous porous wall 104, having an outer surface 105 and an inner surface 106, surrounding a hollow interior chamber 107. Tube 101 is surrounded by a nonporous outer jacket 108, preferably of cylindrical configuration and disposed concentric with tube 101, that encloses the porous wall 104 and forms an annular plenum 109 for cleaning gas. Gas is introduced to plenum 109 through gas inlet ports 110, which penetrate jacket 108. It is preferred that a plurality of gas inlet ports be provided to ensure a sufficient flow of cleaning gas, and that the inlet ports be symmetrically disposed in jacket 108 to facilitate maintenance of equal gas pressure throughout plenum 109. Plenum 109 may be divided into segments or sections (as illustrated in FIG. 8) to form independent plenum sections such as 109a, 109b, 109c, and 109d, if increased control of the gas distribution along the length of tube 101 is desired.

The porous wall 104 of tube 101 is penetrated by a multiplicity of microscopic pores so as to allow the passage of pressurized gas from plenum 109 to interior chamber 107 through the porous wall while preventing the passage of liquid through the wall. The pores may range in dimension from about 10 microns to about 150 microns, and in the preferred embodiment are within the range of about 30 microns to about 40 microns. For effective and efficient performance of the method of the invention, the distribution of pores throughout wall 104 should be uniform, to ensure a uniform and consistent flow of gas from the inner surface of wall 104.

Contaminated liquid feed assembly 200 is connected to VC extraction assembly 100 at the first end of tube 101, and serves to ted incoming contaminated liquid into chamber 107 in a swirl or spiral flow pattern along inner surface 106 of porous wall 104. Contaminated liquid is fed to chamber 107 tangentially to the longitudinal axis of tube 101 and at sufficient velocity to form a thin liquid film that travels around the inner surface of porous wall 104 in a swirl or spiral pattern from first end 102 to second end 103 of tube 101. The primary components of contaminated liquid feed assembly 200 include mounting body 201, tube extension 202, and feed head 203. Mounting body 201 is connected to the end of jacket. 108 associated with the first end of tube 101 in liquid tight and gas tight relation. Tube extension 202 is of the same cross- sectional dimension and configuration as tube 101 and is disposed in mourning body 201 such that tube extension is coaxially aligned and mated with tube 101 when mounting body 201 is connected to jacket 108. Tube extension 202 is formed with a nonporous wall and is not in direct communication with plenum 109. Tube extension 202 is penetrated by a slot-like aperture 204 through which contaminated water is received from feed head 203.

Feed head 203 includes an inlet nipple 205 of generally cylindrical configuration, to be connected to conventional piping (not shown in the drawing figures) to receive a flowing stream of contaminated liquid, an acceleration chamber 206 connected to the inlet nipple, and slotted nozzle 207 connected between acceleration chamber 206 and aperture 204. Acceleration chamber 206 is of the same dimension and configuration as inlet nipple 205 at one end, for connection to the inlet nipple, and narrows in dimension toward its opposite end, which is connected to nozzle 207. The outlet of nozzle 207 is mated with aperture 204 so that liquid flowing through nozzle 207 enters tube extension 202 tangential to the curvature of its inner surface. In the preferred embodiment, the narrowing of acceleration chamber 206 is linear, so that the cross-sectional area of the chamber is smoothly reduced from inlet nipple 205 to nozzle 207. As contaminated liquid is pumped through acceleration chamber 206 at a constant volumetric flow rate the velocity of the liquid entering nozzle 207 is increased in proportion to the decreasing volume of the acceleration chamber, and enters extension tube 202 at a high tangential velocity.

Aperture 204 and nozzle 207 are disposed relative to extension tube 202 such that the flow path, or flow vector, followed by liquid entering the extension tube deviates at a slight angle from perpendicular to the aligned longitudinal axes of the extension tube and tube 101, causing the liquid to assume a spiral flow path toward second end 103 of tube 101 as it travels around the inner surfaces of extension tube 202 and porous wall 104. With tube 101 disposed in a generally horizontal orientation the progression of liquid flow along the length of the tube is not directly affected by the action of gravity, and it will be understood that the number of "turns" followed by the liquid as it travels through tube 101 may be controlled by adjustment of the angle of deviation of the incoming liquid flow from perpendicular to the longitudinal axis of the tube.

Two generally discrete material phases exist within the VC extraction assembly; a VC laden gas phase occupying the center of interior chamber 107, and a froth film (mixed liquid and gas in two phase flow) traveling in a spiral path along the inner surface of porous wall 104. While cleaning gas is introduced to the liquid through porous wall 104 the liquid film includes gas bubbles mixed with and moving through the liquid toward the center of interior chamber 107, as well as moving with the liquid in the spiral path. The cleaned liquid and the VC laden gas reaching the second end of tube 101 at the completion of the cleaning operation are separated into discrete streams in gas-liquid separator assembly 300.

Precise separation between the gas and liquid streams is a significant factor to the efficiency and effectiveness of the VC removal operation, because remixing of VC laden gas with cleaned liquid will result in a recontamination of the liquid proportional to the degree of remixing. Although the VC laden gas and the cleaned liquid are in direct contact while resident in interior chamber 107 of tube 101, the physical dynamics of the system limit the possibility of recontamination. The area of interfacial contact between the gas at the center of interior chamber 107 and the liquid film along the inner surface of porous wall 104, across which mass transport of contaminant molecules might occur, is insignificant in comparison to the area of interfacial contact between the gas bubbles moving through the liquid to the center of the chamber. Further, the gas bubbles exit the liquid surface at a relatively high velocity and in sufficient volume to create a "barrier zone" of gas in which the VC concentration is in approximate equilibrium with the VC concentration in the liquid at the exit point, limiting contact between the liquid and gas containing higher VC concentrations. Physical separation between gas and liquid should be performed while these limitations to recontamination exist, and separator assembly 300 is designed to achieve that purpose.

In the preferred embodiment of the apparatus, gas-liquid separator assembly 300 includes degassing tube 301, separator tube 302, and gas duct 303. Degassing tube 301 is a cylindrical tube having the same inside diameter and configuration as tube 101, with a first end 304 and a second end 305. Degassing tube 301 is disposed in coaxial alignment with tube 101 with its first end 304 mated to second end 103 of tube 101 so as to provide an uninterrupted flow path from tube 101 to, and through, degassing tube 301 for both liquid and gas. The wall of degassing tube 301 is nonporous and is isolated from plenum 109, so there is no flow of cleaning gas into the liquid from the wall of tube 301. Since the flow of gas to the liquid from the tube wall ceases at the end of tube 101, the gas bubbles mixed with the liquid as it exits tube 101 move through and from the liquid during passage through degassing tube 301, and the cleaning gas and the cleaned liquid separate into two discrete phases by the time they reach the second end of tube 301. In the preferred embodiment, the length of degassing tube 301 is about three times its diameter. Each phase occupies a definable portion of the volume of the interior of degassing tube 301; the liquid continuing to flow in an annular band around the inner surface of the inner surface of the tube, and the gas flowing in a cylindrical column through the center of the tube.

Separator tube 302 has a first end 306 of the same inside diameter and configuration as the second end of degassing tube 301, and increases in diameter to a second end 307. Separator tube 302 is coaxially aligned with and connected to degassing tube 301, with the first end of the separator tube mated to the second end of the degassing tube. The increase in diameter of separator tube 302 is smooth and linear from its first end to its second end.

Gas duct 303 is an elongate cylindrical tube with a first end 308 and a second end 309, disposed in coaxial alignment with tubes 101, 301, and 302. Gas duct 303 is defined by a continuous wall with an outer surface 310 and an inner surface 311, and has an outside diameter less than or equal to the inside diameters of tubes 101 and 301, and the inside diameter of the first end of tube 302. The inside diameter of gas duct 303 is preferably about 80% of the inside diameter of tubes 101 and 301, and the first end of tube 302. The thickness of the wall of gas duct 303 is uniform through most of its length from second end 309 toward first end 308, but narrows in proximity to first end 308 with outer surface 311 converging toward inner surface 310 to form a knife edge at first end 308. The angle of convergence of the wall of gas duct 303 is approximately equal to the angle of divergence of the inner surface of separator tube 302.

Gas duct 303 is disposed with its first end 308 extending into the interior of separator tube 302, and gas duct 303 is longitudinally adjustable relative to separator tube 302. With the gas duct extending into the interior of the separator tube, the knife edge at the first end of the gas duct physically divides the interior of the separator tube into an outer annular portion and an inner cylindrical portion, and the adjustability of the distance of extension of the gas duct, along with the increasing inner diameter of the separator tube, allows the lateral dimension and thus the cross-sectional area of the annular portion to be precisely controlled. Since the thickness of the liquid film flowing around and along the inner surface of separator tube may be precisely determined and controlled, the first end gas duct 303 may be positioned within separator tube 302 so that its knife edge lies precisely at the gas-liquid interface and splits the gas and liquid phases at that interface. Further flow of liquid through separator tube 302 occurs in a continuation of the spiral pattern through the annular space between the inner surface of the separator tube and the outer surface of the gas duct, while the gas flows into and through the interior of the gas duct.

The liquid exits the second end of separator tube 302 into clean liquid collection assembly 400, which comprises a vessel 401 of substantially greater internal volume than the combined volumes of tubes 101, 301, and 302. In the preferred embodiment of the apparatus separator tube 302 extends through the wall of vessel 401 so that the second end of separator tube 302, through which the cleaned liquid exits, is disposed in the interior of the vessel, and gas duct 303 also extends through the wall of vessel 401 with its first end received in the interior of separator tube 303. In the preferred embodiment as illustrated, the separator tube extends through port 402, which forms a seal against the outer surface of separator tube 303. In similar manner, gas duct 303 extends through port 403, in a sliding seal arrangement that allows the gas duct to be adjusted longitudinally through the port. Cleaned liquid in vessel 401 may be withdrawn, through outlet pipe 404, continuously or in batches as desired for disposal, use, or further processing.

The VC laden gas flowing through gas duct 303 is collected in gas discharge assembly 500, which, in the preferred embodiment, comprises a hollow vessel 501 into which the second end of the gas duct extends. Gas duct 303 extends into vessel 501 through port 502, which forms a sliding seal against the outer surface of the duct so as to prevent the escape of gas from the vessel. The VC laden gas is withdrawn from vessel 501 through discharge pipe 503. In addition to containing the discharged cleaning gas, vessel 501 also serves a demisting function, and allows any liquid or condensed vapor carried from gas duct 303 to fall to the bottom of the vessel, from which it may be removed through outlet pipe 504.

Gas duct 303 is supported and adjusted longitudinally by means of bearing units 312 and 313. In the preferred embodiment bearing unit 312 is connected to vessel 401 around port 403, and bearing unit 313 is connected to vessel 501 around port 502, but it will be understood that the bearing units may be disposed in other ways if desired, so long as they provide stable, adjustable support for gas duct 303 and provide for longitudinal adjustment of the gas duct relative to separator tube 302. In the illustrated embodiment, bearing unit 3 12 includes a collar 314, which is connected to the exterior surface of the gas duct and serves to stabilize the gas duct. Mechanical means for controlling and setting the longitudinal position of the gas duct and bearing units are well known and readily available, and any suitable adjustment means may be utilized within the scope of the invention.

The method of the invention, utilized in conjunction with appropriate apparatus, is directed to creating favorable conditions for the molecular transfer of contaminant compounds from a liquid solution to a gas, to preventing recontamination of the liquid by reverse transfer, and to separation of the cleaned liquid from the contaminant carrying gas. It is contemplated that the liquid to be cleaned will be water and that the cleaning gas will be air, but the method of the invention is not limited to those compositions. For example, when the VC to be removed from the liquid stream is flammable or explosive and there is a risk of fire or explosion associated with the use of air, steam, nitrogen, or natural gas may be used as the cleaning gas. Natural gas or another fuel gas may be used when it is feasible to use the cleaning gas and recovered VCs as an energy source, as another example.

In an operational context, the method of the invention includes the following basic steps: introducing a stream of contaminated liquid to the hollow interior of a cylindrical tube in a thin film following a spiral flow pattern around and along the wall of the tube; controlling the physical characteristics of the liquid film and the flow pattern followed by the film through the tube; sparging cleaning gas through the wall of the tube and into the liquid film at a preselected flow rate; segregating contaminant laden cleaning gas from the liquid within the tube; and separating the cleaned liquid stream from the contaminant laden gas stream so as to prevent remixing and recontamination of the liquid.

With the apparatus of the invention described above, the contaminated liquid, typically water containing a relatively low concentration of a volatile contaminant compound, is introduced to chamber 107 of tube 101 through nozzle 207 in a thin film "ribbon" that spirals around inner surface 106 of porous wall 104. The creation and maintenance of specific physical properties of that film and its flow through chamber 107 are important to efficient performance of the method of the invention, due to the importance of controlling contact between the liquid film and cleaning gas sparged through porous wall 104. The physical properties of particular significance within the method include the thickness of the film, the speed of travel of a given volume of liquid forming the film along the spiral path, and the number of "turns" around the inner surface of the porous wall made by any given volume of liquid. These properties are dependent upon the physical design of the apparatus used to practice the method and the selected flow rate at which the liquid is introduced to the apparatus.

In the preferred embodiment of the invention the inside diameter of chamber 107 of tube 101 is within the range of about 2 inches to about 6 inches, and in the preferred embodiment of the method the annular area occupied by the undisturbed film at any given cross-sectional point along tube 101 is about one third of the cross-sectional area of chamber 107, yielding a film thickness within the range of about 0.18 inch to about 0.55 inch. In the preferred embodiment of the apparatus the length of tube 101 is within the range of about 24 inches to about 48 inches, and, as discussed below, the preferred number of "turns" made by the liquid in its path through the porous tube is equal to the volumetric flow ratio of gas to liquid utilized in the practice of the method. Consistent with these parameters, a corresponding liquid flow rate within the range of about 15 gallons per minute to about 200 gallons per minute is utilized in the method of the invention, yielding a residence time within the apparatus of about 0.5 second for each incremental volume of liquid.

As the liquid to be cleaned flows through chamber 107 in the controlled spiral pattern created in accordance with the invention, cleaning gas is sparged through porous wall 104 and into immediate contact with the moving liquid in chamber 107. In accordance with the method of the invention, the liquid is moving at a high rate of speed relative to the pores through which cleaning gas exits from the inner surface of the porous wall, and cleaning gas moving into the liquid flow from the stationary pores is immediately sheared from the wall by the tangential force of the moving liquid. Each incremental volume of cleaning gas assumes the form of a generally spherical bubble, surrounded by liquid. The surface of each spherical bubble is thus a liquid to gas interface across which mass transfer may occur. It is known that, in comparison to other geometric forms, a sphere provides the minimum surface area per unit of internal volume. It is also known that since the surface area of a sphere is proportional to the square of its radius and the volume of a sphere is proportional to the cube of its radius, the ratio of surface area to volume increases with decreasing spherical diameter. Formation of very small bubbles thus increases the area of interfacial contact available for contaminant mass transfer from a given volume of liquid to a given volume of gas. The size of the bubbles formed in the apparatus of the invention is determined by four factors; the dimension of the pores through which gas exits porous wall 104, the speed of the liquid across the pores, the exit speed of the gas from the pores toward the center of the porous tube, and the centrifugal force created by the swirling liquid. Pore sizes in the range of 20 to 40 microns have been found to be practical in the selection of material for construction of tube 101. The liquid speed and the magnitude of the centrifugal force field are determined by the liquid flow rate and the inside diameter of tube 101, and the gas exit speed is determined (for a given tube construction) by the volumetric flow rate of the gas. From the preferred values for those factors, the bubble size may be determined to be within the range of about 25 microns to about 50 microns.

The creation and maintenance of a multitude of small gas bubbles intermixed with the contaminated liquid also favors mass transfer from the liquid to the gas by minimizing the physical distance through the space occupied by liquid between bubbles, and thus minimizing the distance that any contaminant molecule must travel through the liquid to the interface. For any given bubble size, the distance between bubbles decreases as the volumetric flow rate of gas relative to liquid increases.

With consideration to these factors, and with the preferred dimensions of chamber 107 referred to above, a liquid flow rate within the range of about 15 gallons per ninute to about 200 gallons per minute, and a gas to liquid volume ratio within the range of about 20 to 1 to about 35 to 1 have been found to be effective parameters for the method of the invention.

The behavior of the gas bubbles and the characteristics of their movement through the liquid is also material to the efficiency of the cleaning operation, and is taken in account within the method of the invention. As the gas bubbles are sheared from porous wall 104 by the flowing liquid, those bubbles are immediately entrained in the flow of liquid and follow the same general spiral flow pattern around and along the wall of the tube. Simultaneously, and immediately upon separation from the wall, the bubbles also begin traveling through the liquid toward the center of chamber 107, in a direction orthogonal to the motion of the liquid stream, or radial to the tube. The radial flow of the bubbles is a result of their bouyancy relative to the liquid under the operating conditions of the system. The highest velocity the bubbles may achieve through the liquid film is described by Stokes Law, from which the terminal velocity may be calculated.

As the liquid spirals around the inner surface of tube 101 within the operating parameters of the method, a centrifugal force field of significant magnitude is created, and corresponding centrifugal acceleration is imposed on the liquid film and on the gas bubbles formed within the liquid. Within the preferred range of operating parameters the centrifugal acceleration ranges from about 400 G to about 1000 G (where G is the standard gravitational acceleration). At those centrifugal accelerations the radial movement of the gas bubbles through the liquid film is not materially affected by gravity, since the gravitational acceleration is insignificant in comparison to the centrifugal acceleration, and the bubble behavior is uniform at all positions around the tube. It has been found that optimum VC removal efficiency is achieved when the residence time of the bubbles in the liquid is equal to the time required for the bubble-liquid mixture to make one turn or revolution within the tube. It has been found that the bubbles will typically have reached terminal velocity when they exit from the liquid film and merge with the gas column at the center of the chamber. Within the particularly preferred operating parameters in which the liquid flow is controlled to make 32 revolutions around the tube during its passage from the first end to the second end, and the volumetric flow ratio of gas to liquid is 32 to 1, it will be understood that the volumetric ratio of gas mixed with liquid in the porous tube at any instant of time is 1 to 1. From these parameters, it can also be determined that, at any given time, the volume of liquid within the porous tube will be equal to the volume of gas mixed with the liquid, and also equal to the volume of the column of gas at the center of the tube. As a corollary, it will be understood that the cross-sectional areas occupied by each phase at any point along the porous tube are also equal. These relationships affect and determine the proportional relationships between the inside diameter of the porous tube and the inside diameter of the gas duct. As described in the context of the apparatus, the first end of the gas duct receives the entirety of the central column of gas, and the inside diameter of the gas duct is equal to the diameter occupied by the central gas column, facilitating collection of the gas by the gas duct and maintaining efficient gas flow characteristics throughout the apparatus.

It is highly desirable that the thickness of the liquid film and of the mixed liquid-gas film (measured radially from the inner surface of tube 101) remain constant throughout the length of the tube, since variations in film thickness produce variations in the flow of gas radially through the film and in the dimensions of the gas column at the center of chamber 107. Such variations, if allowed to occur, will detrimentally affect the efficiency of mass transfer and the flow characteristics of that gas column through tube 101 and into gas duct 303. Maintenance of a uniform film thickness dictates the generally horizontal orientation of the axes of the tubes comprising the apparatus of the invention, as it has been found that significant thinning of the film inevitably occurs toward the lower end of the apparatus when those axes are oriented vertically.

It is also important that the thickness of the liquid-gas and the gas free liquid film remain constant around the inner circumference of the porous tube, the degassing tube, and the separator tube, both for uniform and consistent gas flow and for proper separation of the liquid and gas streams by the apparatus of the invention. As discussed in the context of the apparatus of the invention, precise separation of gas and liquid streams by the knife edge of the gas duct is a significant factor in preventing recontamination of the liquid and thus maintaining the efficiency and VC removal performance of the apparatus and method, and that precise separation depends, in turn, upon uniformity of the annular film of liquid at the location of the first end of the gas duct. Although the effect of gravity is minor in comparison to the effect of the centrifugal force field created by the spiraling liquid, it has been found that the effect is not completely negligible, and the liquid film will not be sufficiently uniform at the first end of the gas duct if the orientation of the tubes is exactly horizontal. The influence of gravity on the uniformity of the liquid film can be alleviated by disposing the longitudinal axes at an angle of about 8 to 10 degrees from the horizontal, with the second ends of the respective tubes elevated. Accordingly, orientation of the apparatus at an incline of 8 to 10 degrees to the horizontal is preferred. Taking the foregoing factors and parameters in combination, the method of the invention, practiced in apparatus as disclosed and described, comprises the following steps:

1. introducing a stream of liquid contaminated by volatile components to be removed from the liquid to the first end of a porous cylindrical tube, of substantially greater length than diameter, tangential to the interior surface of the tube;

2. controlling the flow of the liquid in a spiral pattern around and along the inner surface of the porous tube from the first end to the second end, such that each incremental volume of liquid moves around the inner surface of the porous tube between about 20 and about 35 times;

3. sparging a cleaning gas through the wall of the porous tube and through the liquid spiraling through the tube at a gas to liquid volumetric flow ratio between about 20 to 1 and about 35 to 1, with the volumetric flow ratio equal to the number of times each incremental volume of liquid moves around the inner surface of the porous tube, whereby contaminant components are transferred from the liquid to the gas;

4. ceasing sparging of cleaning gas into the liquid in a region adjacent to the second end of the tube while allowing the liquid to continue spiraling toward the second end of the tube for a sufficient distance and time to allow degassing of the liquid and separation of the gas and liquid into an annular film of liquid around the inner circumference of the tube and a column of gas at the center of the tube;

5. drawing the column of gas toward the second end of the tube in co-current flow with the movement of liquid along the tube;

6. physically dividing the liquid from the gas at the second end of the tube by interposing a cylindrical duct between the gas and the liquid at the gas-liquid interface;

7. collecting the cleaned liquid in a first collection vessel; and 8. conveying the contaminant laden gas through the cylindrical duct from the apparatus.

The method of the invention provides highly efficient removal of VCs from liquids in conjunction with the apparatus of the invention, and effectively optimizes the mechanical parameters for operation of a VC removal system.

It should be noted, and will be understood by those skilled in the art, that efficient operation of VC removal apparatus and efficient control of process operating parameters as disclosed above does not necessarily result in the complete or even substantially complete removal of all types of volatile contaminants from water or other liquids. It must be recognized that effective VC stripping, or removal, performance is dependent upon the properties of the VC to be removed from the liquid; i.e., the degree to which a particular contaminant compound is amenable to mass transfer across a gas-liquid interface in response to a concentration gradient. It will be understood that the maximum practical performance of any "single pass" air stripping apparatus and method in general, and the apparatus and method of the invention in particular, is directly related to the Henry's Constant for the contaminant to be removed. In general, the higher the value of Henry's Constant, the higher the removal performance achievable in a single pass. In particular, desirable results may be obtained with the apparatus and method of the present invention when the Henry's Constant for the VC to be removed is greater than 95 atmospheres/mole fraction. Because of the dynamics of the liquid flow through the apparatus, there is a practical limit to the length of the tube through which the liquid may be spiraled before the liquid film flow pattern decays beyond acceptable limits, and there is thus a practical limit to the volume of cleaning gas that can be moved through the liquid in a single pass through any apparatus. The apparatus and method of the invention provide highly efficient reduction of VC concentrations approaching the practical single pass performance limits. Further reduction of VC concentration in the liquid stream may be achieved by recycling the liquid through the apparatus, or by passing the liquid through additional units of the apparatus.

Total single pass performance may also be enhanced by increasing the value of Henry's Constant during the processing operation, and thus decreasing the practical concentration limit that may be achieved. The value of Henry's Constant for volatile compounds is dependent upon and proportional to the temperature of the compound or of a solution containing the compound, and the decrease in Henry's Constant with relatively slight decreases in temperature below about 25 degrees Celsius is pronounced. The increase in Henry's Constant with increasing temperature is also pronounced, and this property may be utilized within the context of the method of the invention to improve the overall removal performance of the apparatus and method when Henry's Constant for the targeted contaminant is inherently low or is suppressed by low ambient temperatures.

In an alternative to the preferred embodiment of the apparatus and to the preferred steps of the method, heating means may be employed to heat the contaminated liquid before its introduction to the apparatus for VC removal. Any convenient conventional means of heating may be employed, and the degree of heating utilized may be optimized between the increase in performance to be gained and the increased cost involved. Heating may also be combined with the use of additional processing "passes" through the VC removal apparatus to enhance total performance.

The foregoing description of the preferred embodiments of the apparatus and method of the invention are illustrative and not for purposes of limitation. It will be understood that both apparatus and method are amenable to various alternative embodiments and modifications within the scope of the invention.

We claim:

1. A method of removing volatile contaminants from a liquid utilizing apparatus having an elongate disposed tube with first and second ends, with a wall, and with a porous section for the sparging of cleaning gas therethrough to the interior of the tube, having a nonporous degassing section adjacent to the second end of the tube, and also having a cylindrical gas duct in coaxial alignment with the tube, comprising the steps of introducing a stream of liquid contaminated by volatile components to be removed from said liquid to the first end of the porous section of the cylindrical tube tangential to the interior surface of said tube;

controlling the flow of said liquid in a spiral pattern around and along said inner surface of said tube from said first end to the second end, such that each incremental volume of liquid moves around said inner surface of said tube between about 20 and about 35 times;

sparging a cleaning gas through the wall of said porous section of said tube and through said liquid spiraling through said tube at a gas to liquid volumetric flow ratio between about 20 to 1 and about 35 to 1, with said volumetric flow ratio equal to the number of times each incremental volume of said liquid moves around the inner surface of said porous section of said tube, whereby contaminant components are transferred from said liquid to said gas;

ceasing sparging of cleaning gas into said liquid in the degassing section adjacent to said second end of said tube while allowing said liquid to continue spiraling toward said second end of said tube for a sufficient distance and time to allow degassing of said liquid and separation of said gas and said liquid into an annular film of liquid around the inner circumference of said tube and a column of gas at the center of said tube;

drawing said column of gas toward the second end of said tube in co-current flow with the movement of liquid along said tube;

physically dividing said liquid from said gas at said second end of said tube by interposing said cylindrical gas duct between said gas and said liquid at the gas-liquid interface;

collecting the cleaned liquid in a first collection vessel; and conveying the contaminant laden gas through said cylindrical gas duct from the apparatus.

2. The method of claim 1, wherein said liquid flows around and along said inner surface of said tube in a liquid film of uniform thickness from said first end of said tube to said second end of said tube.

3. The method of claim 2, wherein the portion of the cross-sectional area of the interior of said porous section of said tube occupied by said liquid film prior to the sparging of said gas therethrough is approximately one-third of the total cross-sectional area of said tube.

4. The method of claim 1, wherein said sparging of said gas through said liquid forms a two phase gas-liquid froth flowing in a spiral pattern around and along said inner surface of said porous section of said tube, said froth including a multiplicity of bubbles of said gas in direct contact with said liquid, said bubbles moving through said froth from said inner surface of said tube toward the center of said tube.

5. The method of claim 4, wherein the volume of gas in said froth is approximately equal to the volume of liquid in said froth.

6. The method of claim 5, wherein the portion of the cross-sectional area of the interior of said porous section of said tube occupied by said froth at any point along the length of said porous section of said tube is approximately two-thirds of the total cross-sectional area of said porous section of said tube.

7. The method of claim 6, wherein said gas passes through said froth within the interior of said porous section of said tube to form a column of liquid-free gas at the center of said tube.

8. The method of claim 7, wherein said the portion of the cross-sectional area of the interior of said tube occupied by said column of gas at the center of said tube at any point along the length of said tube is approximately one-third of the total cross-sectional area of said tube.

9. The method of claim 7, wherein the time required for each of said bubbles of said gas to move through said froth from said inner surface of said porous section of said tube to said column of gas at the center of said tube is approximately equal to the time required for an incremental volume of said froth to move once around said inner surface of said porous section of said tube.

10. The method of claim 4, wherein each of said bubbles has a diameter within the range of about 25 microns to about 50 microns.

11. The method of claim 4, wherein the flow of said liquid around and along said inner surface of said tube is controlled so as to impose centrifugal acceleration within the range of about 400 gravities to about 1000 gravities upon said froth.

12. A method of removing volatile contaminants from a liquid utilizing apparatus having an elongate disposed cylindrical tube with first and second ends and a longitudinal axis, and with a porous section for the sparging of cleaning gas therethrough to the interior of the tube, having a nonporous degassing section adjacent to the second end of the tube, and also having a cylindrical gas duct in coaxial alignment with the tube at the second end of the tube, comprising the steps of introducing a stream of liquid contaminated by volatile components to be removed from said liquid to the first end of the porous section of the cylindrical tube tangential to the interior surface of said tube;

controlling the flow of said liquid in a spiral pattern around and along the inner surface of said tube from the first end to the second end thereof, such that said liquid forms an annular film flowing radially about the longitudinal axis of said tube and longitudinally along said tube;

controlling the radial velocity of the flow of said liquid around said inner surface of said tube so as to create a centrifugal force field imposing centrifugal acceleration upon said liquid within the range of about 400 gravities to about 1000 gravities;

sparging a cleaning gas through the wall of said porous tube and into said liquid in a multiplicity of small bubbles, forming a two phase gas-liquid froth flowing in an annular pattern around the inner surface of said tube, whereby contaminant components are transferred from said liquid to said gas in said froth, and through said froth to said center of said tube to form a liquid-free column of said contaminant-laden gas at said center of said tube;

ceasing sparging of said gas into said liquid in the degassing section adjacent to said second end of said tube while allowing said liquid to continue spiraling toward said second end of said tube for a sufficient distance and time to allow degassing of said liquid and separation of said froth into an annular film of liquid around the inner circumference of said tube and a column of contaminant-laden gas at the center of said tube;

physically dividing said liquid from said contaminant-laden gas at the second end of said tube by interposing said cylindrical gas duct between said gas and said liquid at the interface therebetween; and conveying said contaminant-laden gas through said cylindrical gas duct from said second end of said tube in a flow co-current with the longitudinal flow of said liquid.

13. The method of claim 12, wherein the volumetric flow ratio between the total volume of said gas passed through said tube and the total volume of said liquid passed through said tube during any given time interval is in the range of about 20 to 1 to about 35 to 1.

14. The method of claim 13, wherein each incremental volume of said liquid moves radially around said inner surface of said tube through a number of revolutions within the range of about 20 to about 35 while moving longitudinally through said porous section of said tube.

15. The method of claim 14, wherein said number of revolutions is approximately equal to said volumetric flow ratio, and wherein the ratio between the volume of said gas in said froth and the volume of said liquid in said froth at any instant of time is about 1 to 1.

16. The method of claim 15, wherein said froth has a cross-sectional area approximately equal to two-thirds the total cross-sectional area of said porous section of said tube and wherein said column of contaminant-laden gas has a cross-sectional area approximately equal to one-third the total cross-sectional area of said porous section of said tube.

17. The method of claim 12, wherein the diameter of each of said bubbles of said gas in said froth is within the range of about 25 microns to about 50 microns.

18. The method of claim 12, wherein the radial thickness of said froth from said inner surface of said tube toward said center of said tube is uniform through the length of said porous section of said tube.

19. The method of claim 12, wherein said liquid is heated prior to introduction of said liquid to said first end of said tube.

* * * * *